United States Patent
Sakamoto et al.

(10) Patent No.: US 11,921,320 B2
(45) Date of Patent: Mar. 5, 2024

(54) OPTICAL CIRCUIT

(71) Applicant: Nippon Telegraph and Telephone Corporation, Tokyo (JP)

(72) Inventors: Junji Sakamoto, Musashino (JP); Tomohiro Inaba, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 78 days.

(21) Appl. No.: 17/615,688

(22) PCT Filed: Jun. 4, 2019

(86) PCT No.: PCT/JP2019/022210
§ 371 (c)(1),
(2) Date: Dec. 1, 2021

(87) PCT Pub. No.: WO2020/245923
PCT Pub. Date: Dec. 10, 2020

(65) Prior Publication Data
US 2022/0229232 A1    Jul. 21, 2022

(51) Int. Cl.
G02B 6/14 (2006.01)
G02B 6/12 (2006.01)
G02B 6/293 (2006.01)

(52) U.S. Cl.
CPC .......... *G02B 6/12007* (2013.01); *G02B 6/14* (2013.01); *G02B 6/29332* (2013.01); *G02B 6/2938* (2013.01)

(58) Field of Classification Search
None
See application file for complete search history.

(56) References Cited

U.S. PATENT DOCUMENTS

2019/0056552 A1    2/2019 Sakamoto et al.

FOREIGN PATENT DOCUMENTS

| FR | 2724735 A1 | * | 3/1996 | ......... G02B 6/29332 |
| JP | 2015-230464 A | | 12/2015 | |
| JP | 2015230464 A | * | 12/2015 | |
| WO | 2017/142076 A1 | | 8/2017 | |

OTHER PUBLICATIONS

Translation of FR2724735 (Year: 1996).*
Translation of JP2015-230464 (Year: 2015).*
Akira Nakao et al., *Integrated Waveguide-Type Red-Green-Blue Beam Combiners for Compact Projection-Type Displays*, Optics Communications, vol. 330, 2014, pp. 45-48.

* cited by examiner

*Primary Examiner* — Chad H Smith
(74) *Attorney, Agent, or Firm* — Workman Nydegger

(57) ABSTRACT

There is a manufacturing error even if an RGB coupler is appropriately designed, and thus a problem that it is difficult to achieve the function as designed with good yield arises. To solve this problem, an optical circuit with a first waveguide in which light in a zero-th order mode is guided and a second waveguide having a larger width than the first waveguide, in which light in a primary mode is guided in which the first and second waveguides at least include a first curved portion in a curve shape curved toward the first waveguide while maintaining a combination of waveguide widths satisfying mode conversion conditions is provided.

10 Claims, 19 Drawing Sheets

OPTICAL CIRCUIT

TECHNICAL FIELD

The present disclosure relates to an optical device, and more particularly to a wavelength multiplexing/demultiplexing optical circuit using a mode.

BACKGROUND ART

An RGB coupler module using a quartz-based planar lightwave circuit (PLC) has recently gained attention as a circuit element that multiplexes three primary color visible light beams for eyeglass-type devices and projectors (see Non Patent Literature 1, for example). In the PLC, an optical waveguide is created on a planar substrate through patterning and etching processes using photolithography or the like, and a plurality of basic optical circuits (e.g., directional couplers, Mach-Zehnder interferometers, etc.) are combined with each other to implement various functions. (see Patent Literature 1, for example)

There is a multiplexing circuit for three primary colors of light using, for example, a directional coupler and/or a Mach-Zehnder interferometer (see Non Patent Literature 1). Furthermore, a wavelength multiplexing circuit using mode conversion is known. A case in which mode conversion is used (see Patent Literature 1) will be described in examples of FIGS. 1 to 4.

A mode coupler of the related and an RGB coupler that uses the mode coupler will be briefly described. FIG. 1 illustrates a cross-sectional view of a quartz-based planar lightwave circuit (PLC) 100. The PLC is an embedded waveguide in which a core 103 with a high refractive index and a cladding 102 with a low refractive index are created on a substrate 101 made of Si or the like, using a glass film formation technology and a semiconductor microfabrication technology.

FIG. 2 illustrates an overview of the mode coupler. The core is assumed to be surrounded by the cladding. The mode coupler includes a single mode waveguide (SM_WG) 103a and a multi-mode waveguide (MM_WG) 103b. The single mode waveguide (SM_WG) 103a and the multi-mode waveguide (MM_WG) 103b of FIG. 2 correspond to the core 103 of FIG. 1. In a case of the mode coupler that converts a zero-th order mode and a primary mode, for example, by setting combinations of waveguide widths to $W_0$ and $W_1$ so that propagation constants of the zero-th order mode and the primary mode propagating the single mode waveguide (SM_WG) 103a and the multi-mode waveguide (MM_WG) 103b, respectively, match each other at a target wavelength as illustrated in FIG. 3, the mode can be converted between the single mode waveguide (SM_WG) 103a and the multi-mode waveguide (MM_WG) 103b as illustrated in FIG. 2. On the other hand, light in the zero-th order mode propagating through the multi-mode waveguide (MM_WG) 103b is transmitted as it is because the propagation constant does not match that in any mode in which light propagates through the single mode waveguide (SM_WG) 103a. The mode coupler is often used as a mode converter for mode multiplex transmission.

Next, an RGB coupler which is a wavelength multiplexer that uses a mode coupler will be briefly described. FIG. 4(a) illustrates a layout of an RGB coupler. To set the output in the zero-th order mode, RGB light beams are multiplexed in two stages using a mode coupler with MM_WG sandwiched by SM_WGs. The mode coupler is designed to have a waveguide width to satisfy mode conversion conditions in the wavelength of green light (G) in the first stage and have a waveguide width to satisfy the mode conversion conditions in the wavelength of red light (R) in the second stage. Only green light (G) is mode-converted and multiplexed in the first stage as illustrated in FIG. 4(b), only red light (R) is mode-converted and multiplexed in the second stage as illustrated in FIG. 4(c), and thus it is possible to multiplex RGB light beams in the same waveguide.

CITATION LIST

Patent Literature

Patent Literature 1: WO 2017/142076

Non Patent Literature

Non Patent Literature 1: A. Nakao, R. Morimoto, Y. Kato, Y. Kakinoki, K. Ogawa and T. Katsuyama, "Integrated Waveguide-type Red-Green-Blue Beam Combiners for Compact Projection-type Displays", Optics Communications 330 (2014), pp. 45-48

SUMMARY OF THE INVENTION

Technical Problem

It is necessary to design a waveguide width appropriately to cause light to transition to a different waveguide through mode conversion. However, because there is a manufacturing error even if a width is appropriately designed, fluctuation in characteristics occurs due to the manufacturing error, and a problem that it is difficult to achieve the function as designed with good yield arises.

In addition, in a linear configuration of the related art, in waveguides in which light is guided in the zero-th order mode and the primary mode, it is not possible to maintain sensitivity to characteristics of a waveguide width in each mode order number at a lowest level (high manufacturing tolerance), and only one of modes can to be optimized.

Means for Solving the Problem

The present disclosure has been made to solve such problems, and an objective of the present disclosure is to provide an optical circuit that reduces fluctuation in characteristics due to manufacturing error in a mode coupler by bending the mode coupler to change mode conversion conditions and matching the mode conversion conditions with conditions in which a field change of light with respect to a waveguide width is small.

To achieve this objective, an aspect of an optical circuit according to the present disclosure is that, in an optical circuit that is a mode conversion circuit and includes a first waveguide configured to guide light in an N-th order mode (N is an integer satisfying N≥0) and a second waveguide, having a larger width than the first waveguide, configured to guide light in an M-th order mode (M is an integer satisfying M>N), in which the first waveguide and the second waveguide include at least a first curved portion in a curve shape curved toward the first waveguide while maintaining a combination of waveguide widths satisfying a mode conversion condition.

The mode conversion conditions are determined by a waveguide width and a gap between the waveguides. This combination is applied when propagation constants in the two modes match. A coupler length in which input light beams (e.g., in the zero-th order mode) are all converted to light beams in a higher order mode can be appropriately set to a length in which conversion is properly completed in a known numerical analysis technique, or the like.

Effects of the Invention

A curved portion that is a feature in the present application allows waveguide widths to be close to each other in the two mode order numbers. Therefore, the effect that the influence of a manufacturing error on both waveguides is reduced can be exhibited. As a result, manufacturing tolerance can be increased.

DESCRIPTION OF EMBODIMENTS

Figure 1:
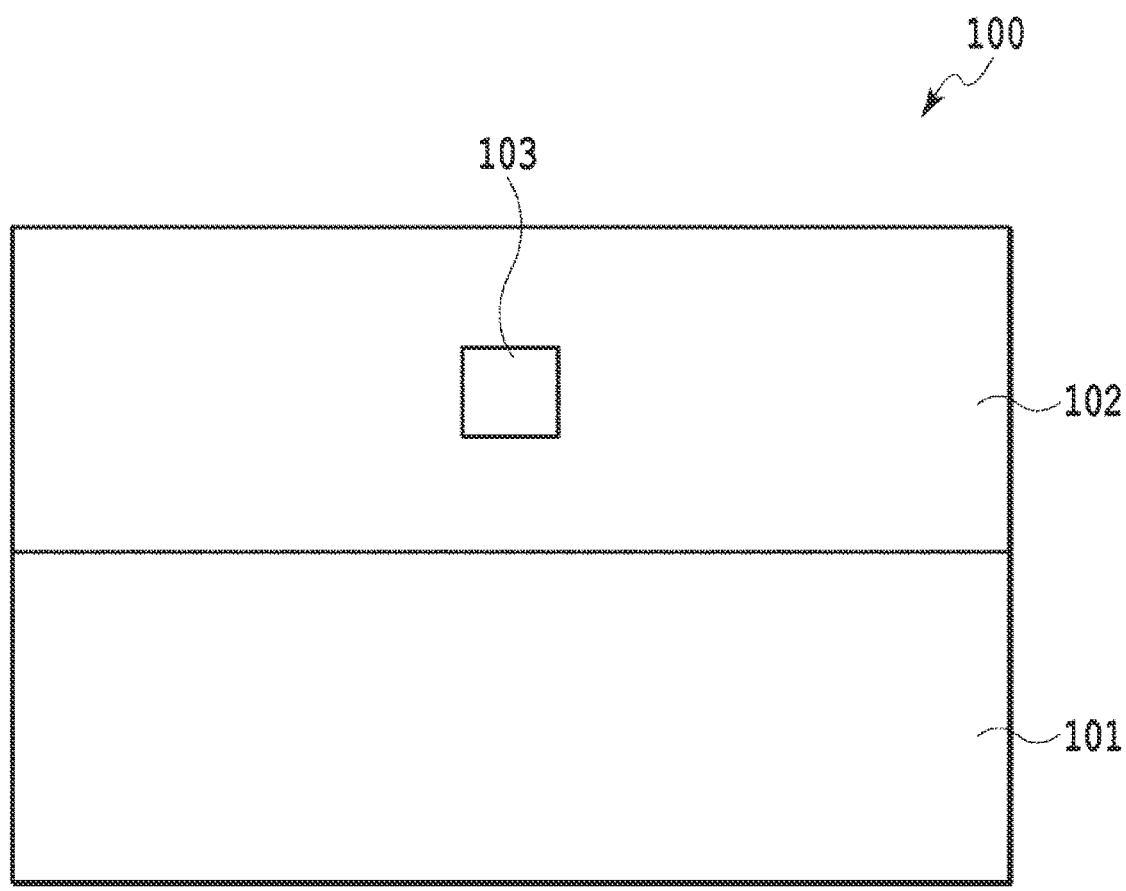
FIG. 1 illustrates a cross-sectional view of a quartz-based planar lightwave circuit (PLC) of the related art.
Figure 2:
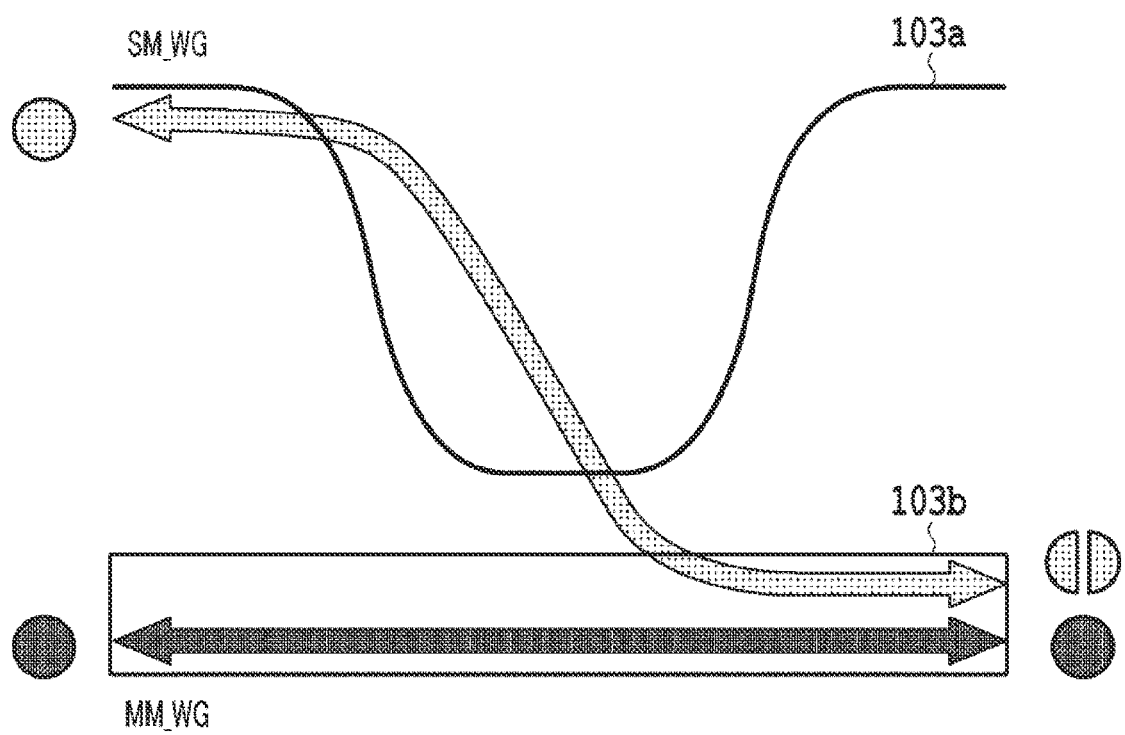
FIG. 2 illustrates an overview of a mode coupler of the related art.
Figure 3:
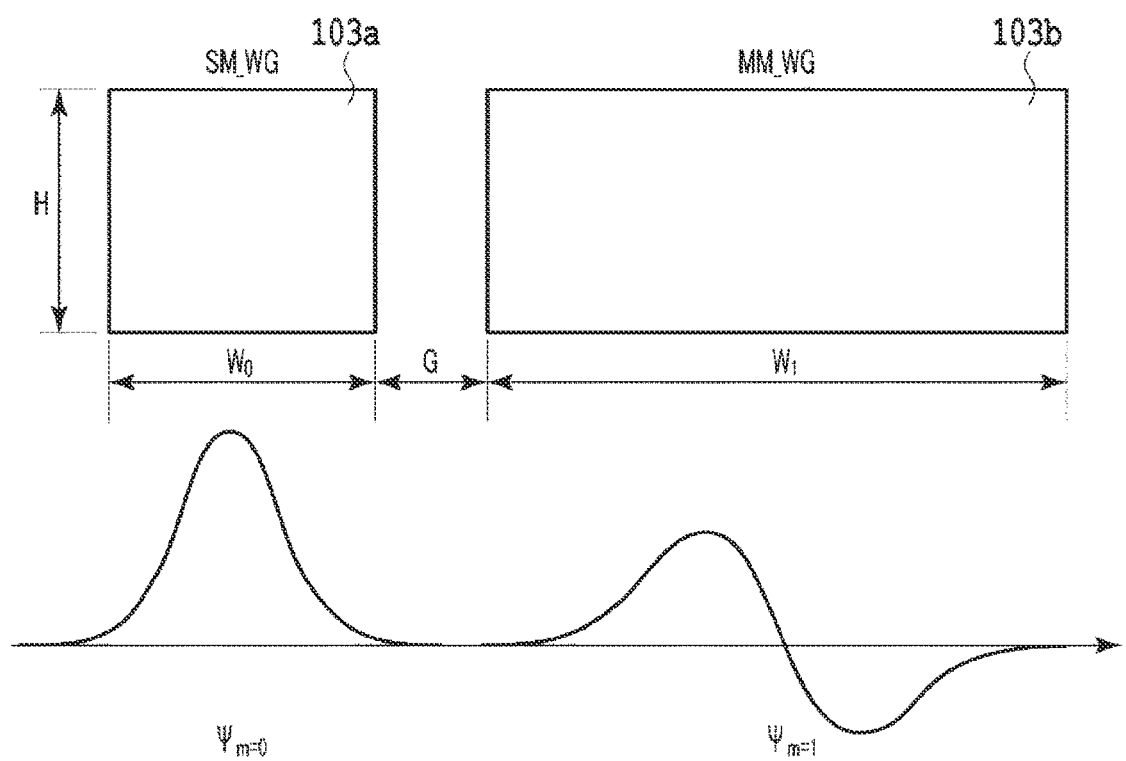
FIG. 3 is a diagram illustrating a mode coupler of the related art that converts a zero-th order mode and a primary mode.
Figure 4:
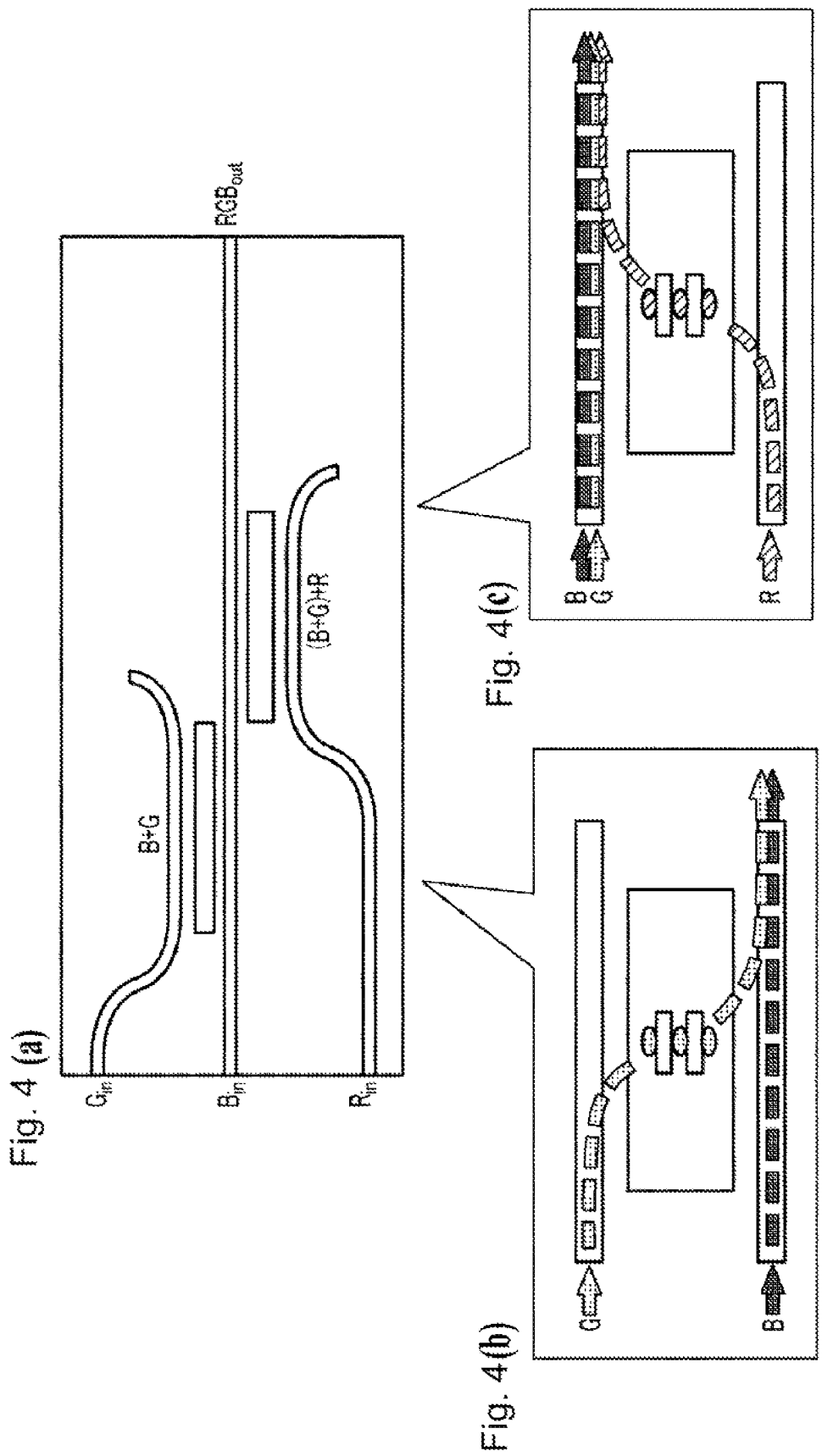
FIG. 4(a) illustrates a layout of an RGB coupler.
FIG. 4(b) is a diagram illustrating a mode coupler in a first stage of the RGB coupler of the related art.
FIG. 4(c) is a diagram illustrating a mode coupler in a second stage of the RGB coupler of the related art.

Embodiments of an optical circuit of the present disclosure will be described in detail below with reference to the drawings. However, it is obvious to those skilled in the art that the present disclosure is not limited to the content described in the embodiments that are introduced below, and a mode and details thereof can be modified in various ways without departing from the spirit of the disclosure disclosed in this specification and the like. Further, configurations according to different embodiments can be appropriately combined and implemented. In addition, in the configurations of the present disclosure described below, the same parts or parts having the same functions will be denoted by the same reference numerals and repetitive description thereof will be omitted in some cases.

First Embodiment

In the present embodiment, a method for reducing dependence on waveguide widths of a mode coupler will be described using FIGS. 5 to 8. A manufacturing error caused by photolithography or reactive ion etching (RIE) is assumed particularly in a manufacturing process in the disclosure of the present embodiment, and thus the single mode waveguide (SM_WG) $103a$ and the multi-mode waveguide (MM_WG) $103b$ are assumed to have a width change $\Delta W$ similarly. For example, when a width of the single mode waveguide (SM_WG) $103a$ becomes narrower by $\Delta W$, a width of the multi-mode waveguide (MM_WG) $103b$ also becomes narrower by $\Delta W$, and thus a gap between the waveguides is widened by $\Delta W$.

Figure 5:
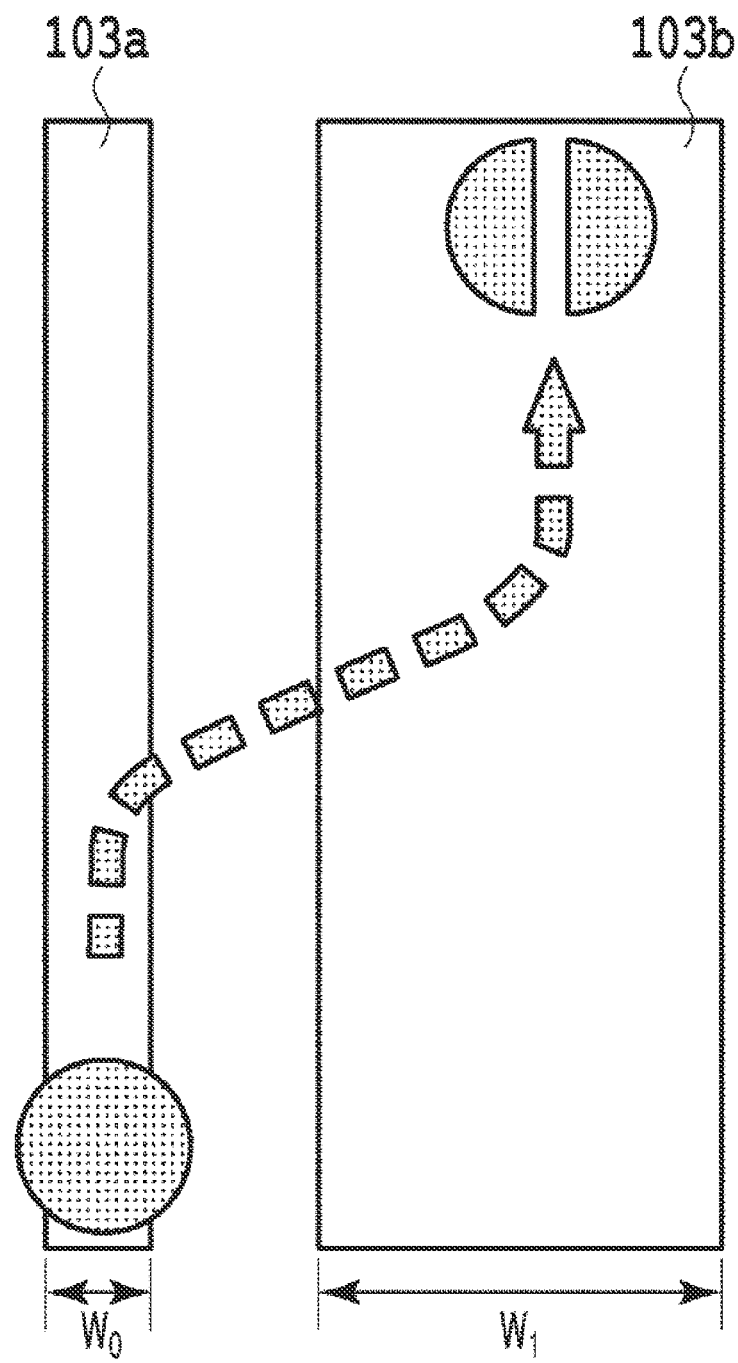
FIG. 5 is a diagram illustrating a mode coupler described in a first embodiment of the present disclosure.

It is assumed that the mode coupler illustrated in FIG. 5 satisfies mode conversion conditions at $W_0$ and $W_1$ in a desired wavelength.

Figure 6:
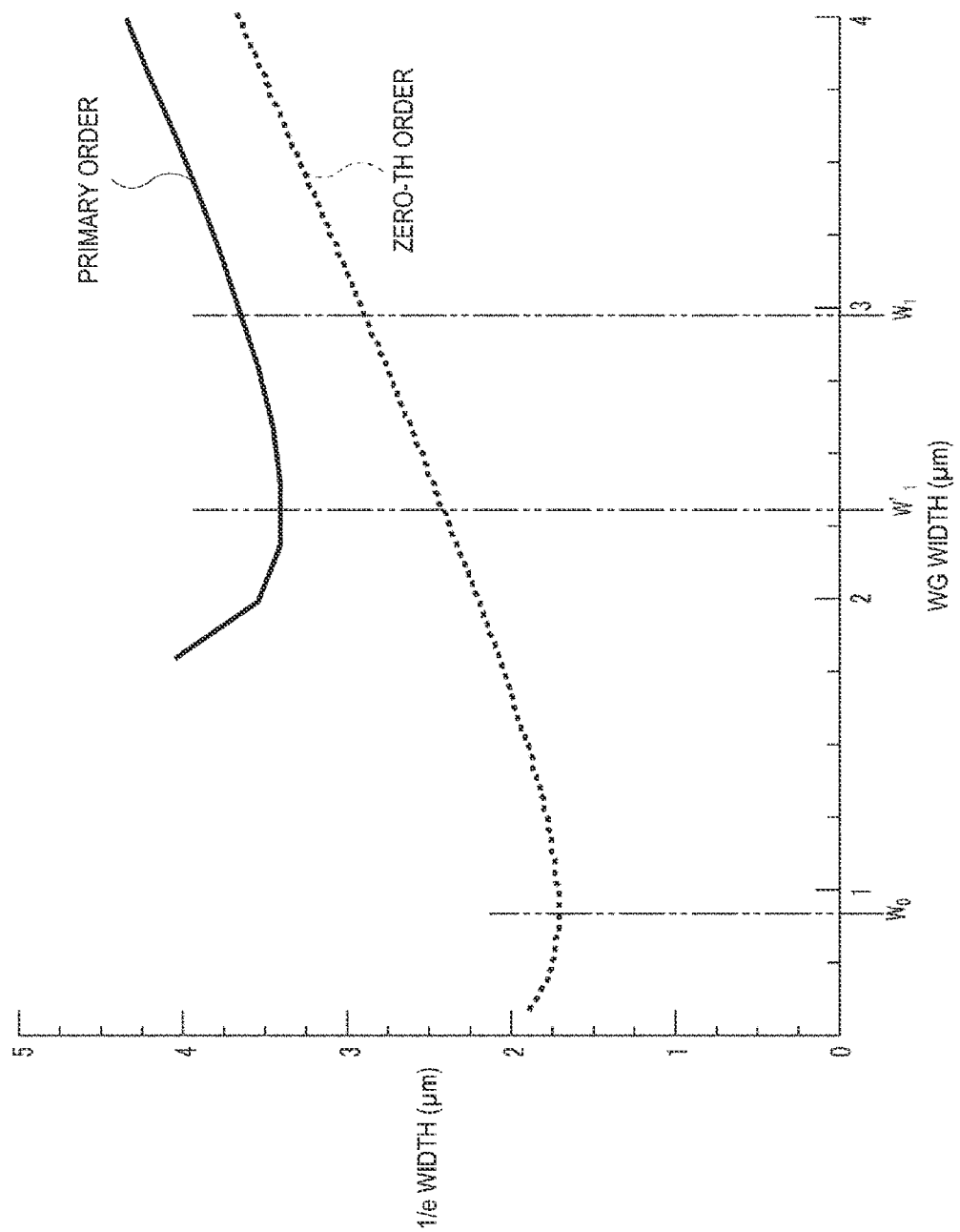
FIG. 6 is a diagram illustrating a relationship between a waveguide width and an 1/e width of propagating light described in the first embodiment of the present disclosure.

A relationship between a width of a waveguide and a 1/e width of light propagating through the waveguide is illustrated in FIG. 6. The 1/e width is defined as a width of a waveguide in which propagating light is located at 1/e from a peak maximum value. FIG. 6 shows calculation results obtained using a mode solver under conditions of a difference in refractive index 1% between the core and the cladding, a thickness of the core of 1.8 μm, and a wavelength of 520 nm. When a waveguide width becomes narrower, the 1/e width decreases; however, when it becomes much narrower than any waveguide width, light cannot be trapped and the 1/e width starts to increase. If a waveguide width $W_0$ is adjusted to this extreme value, the field of light changes a little even with respect to a change in the waveguide width, so characteristics of the mode coupler are less likely to change. Furthermore, by adjusting a waveguide width $W_1$ also to the extreme value, it is possible to configure a mode coupler that is tolerant of fluctuation in the waveguide width; however, the waveguide width $W_1$ satisfying the mode conversion conditions of the mode coupler and a waveguide width $W_1'$ serving as an extreme value generally do not match, and thus the conditions for the extreme value cannot be used.

Figure 7:
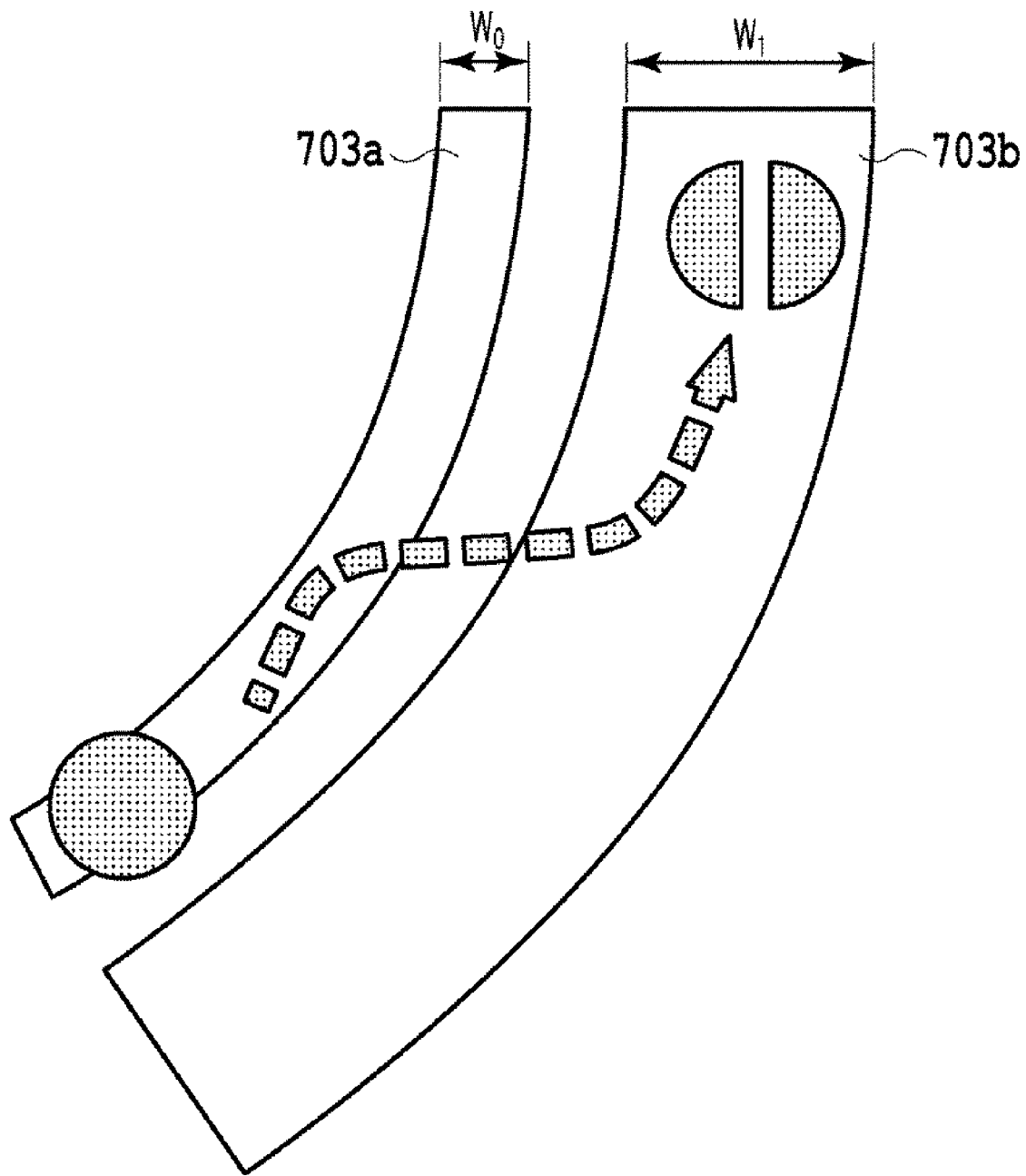
FIG. 7 is a diagram illustrating a mode coupler according to the first embodiment of the present disclosure.

In the disclosure according to the present embodiment, the dependence on waveguide widths is reduced by bending the mode coupler and causing the waveguide width serving as an extreme value and the waveguide width satisfying the mode conversion conditions to match. In FIG. 7, a case in which the mode coupler is bent and MM_WG is placed outside a bending with respect to SM_WG is considered.

FIG. 7 illustrates an optical circuit with a first waveguide 703a in which light in an N-th order mode (N is an integer satisfying N≥0) is guided and a second waveguide 703b that has a larger width than the first waveguide and in which light in an M-th order mode (M is an integer satisfying M>N) is guided including at least a first curved portion to be described below. Here, the first curved portion has a curve shape curved toward the first waveguide 703a while the first waveguide 703a and the second waveguide 703b maintain a combination of waveguide widths satisfying the mode conversion conditions. For example, N is equal to 0, and M is equal to 1.

The mode conversion conditions are determined by a waveguide width and a gap between the waveguides. A combination thereof is chosen such that propagation constants of two modes match. A coupler length in which input light beams (e.g., in the zero-th order mode) are all converted to light beams in a higher order mode can be appropriately set to a length in which conversion is properly completed in a known numerical analysis technique, or the like. In the present specification, a gap refers to a spacing between waveguides. The gap in the present embodiment refers to the spacing between the first waveguide 703a and the second waveguide 703b.

Figure 8:
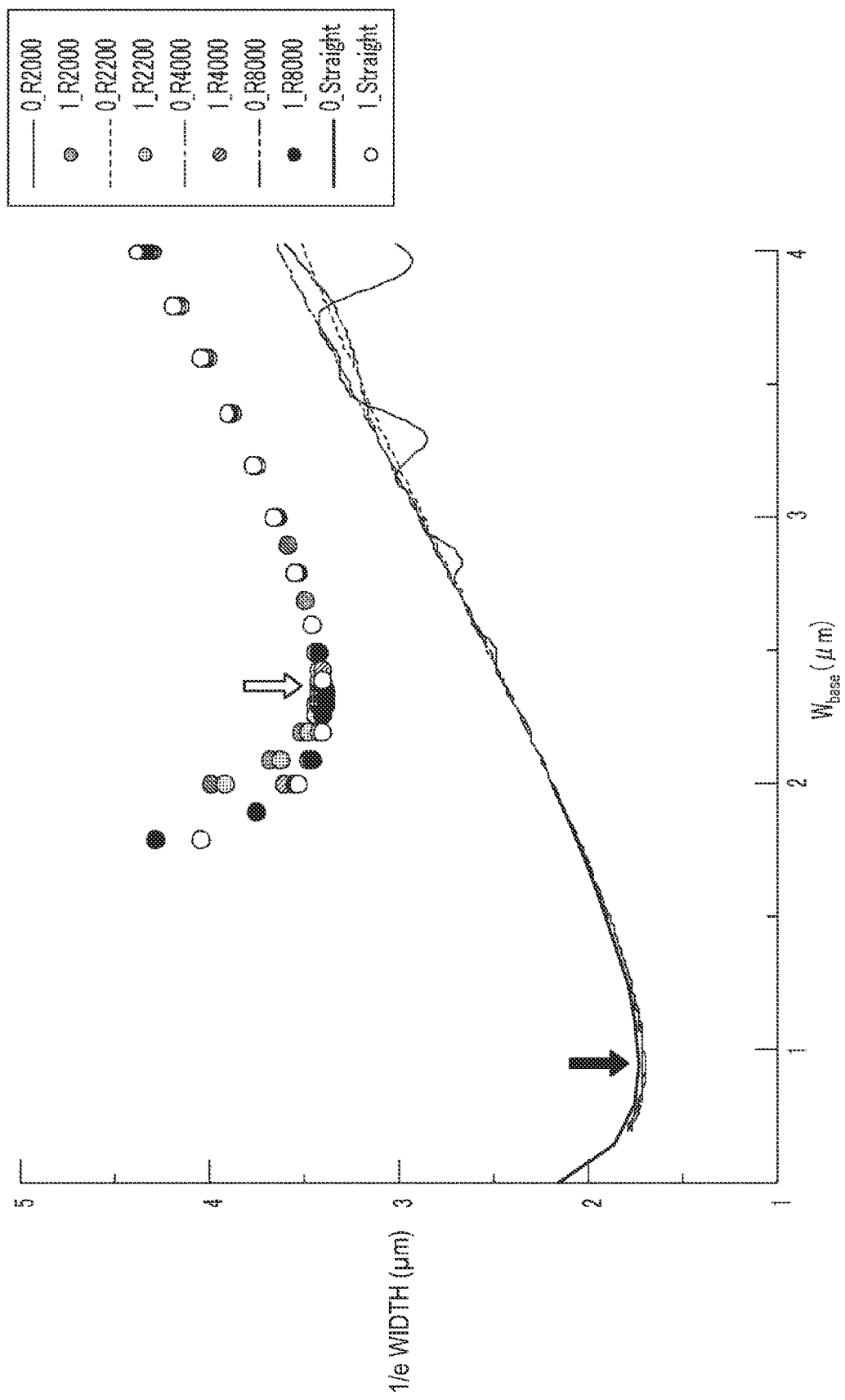
FIG. 8 is a diagram illustrating calculation results of an 1/e width when a bending radius (curvature radius) is changed according to the first embodiment of the present disclosure.
Figure 9:
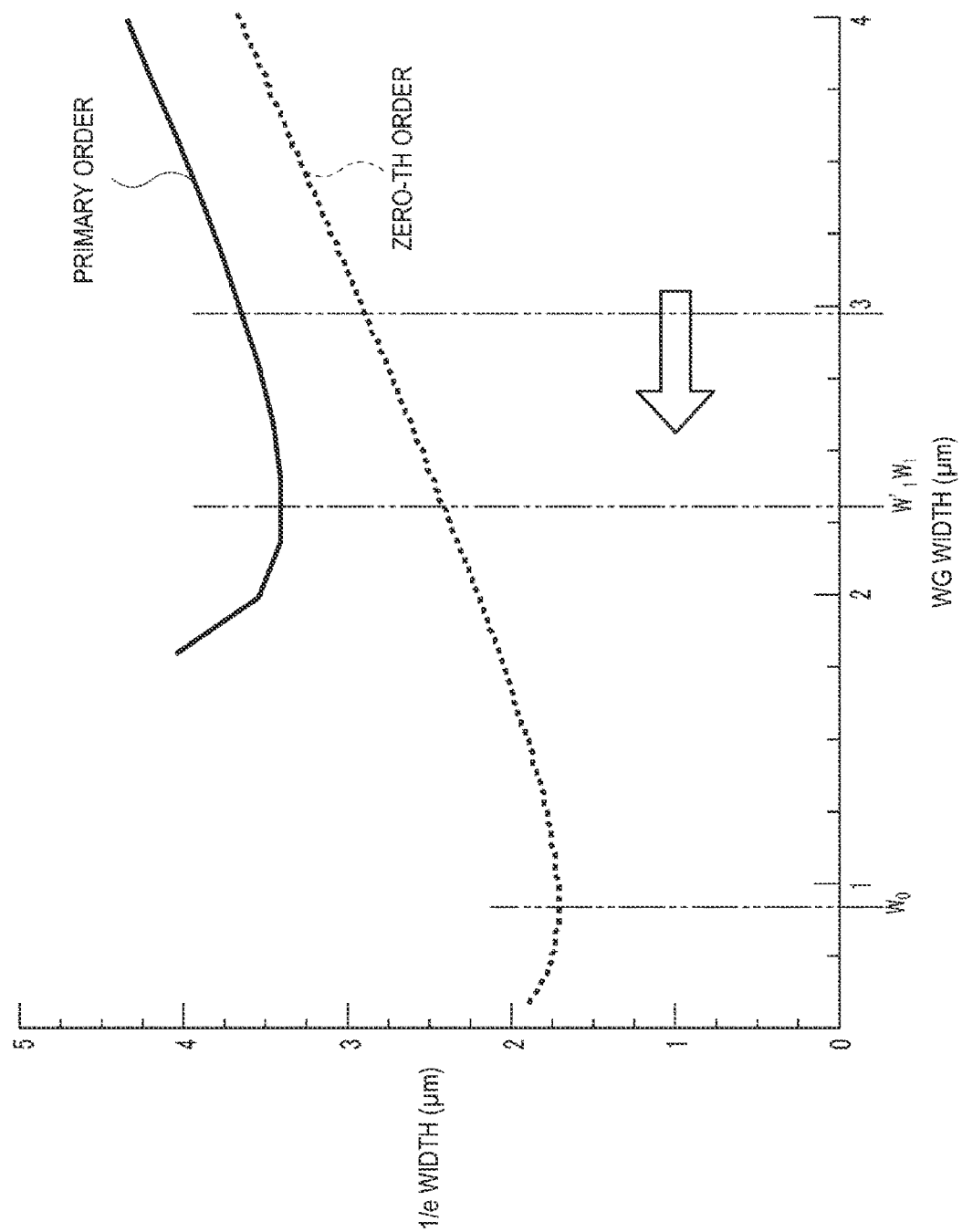
FIG. 9 is a diagram illustrating a relationship between a WG width and an 1/e width according to the first embodiment of the present disclosure.

FIG. 8 shows calculation results for the 1/e width when the bending radius (radius of curvature) is changed. In the legend, the numbers in front of _ (underscores) indicate mode order numbers, and the numbers after R indicate bending radii [μm]. According to FIG. 8, it can be seen that even when the bending radius is changed, the waveguide width that minimizes the 1/e width in the primary mode and the zero-th order mode is almost unchanged. When the mode coupler is bent, the second waveguide (MM_WG) 703b has a longer propagation distance than the first waveguide (SM_WG) 703a due to the difference in curvature. To fill this difference, the optical path length which is an effective propagation distance needs to be shortened. To shorten the optical path length, there is a method for lowering the effective refractive index by narrowing the waveguide width, and as a result, $W_1$ can be brought close to $W_1'$ which is an extreme value condition, as in FIG. 9 (in which the horizontal axis represents WG width and the vertical axis represents 1/e width [μm]). Note that, when an extreme value is applied to a thicker side, it is only required for MM_WG to be placed inside the bending of SM_WG. Specifically, assuming that a curvature of the center of SM_WG is set to R, an inter-center distance of SM_WG and MM_WG is set to d, and an effective refractive index of light propagating MM_WG at a wavelength λ is set to $n_\lambda eff$, the waveguide width needs to be narrowed so that a change in the refractive index change corresponding to the following equation occurs.

$$dn = \left(1 - \frac{R+d}{R}\right) n_{\lambda eff} \quad (1)$$

Figure 10:
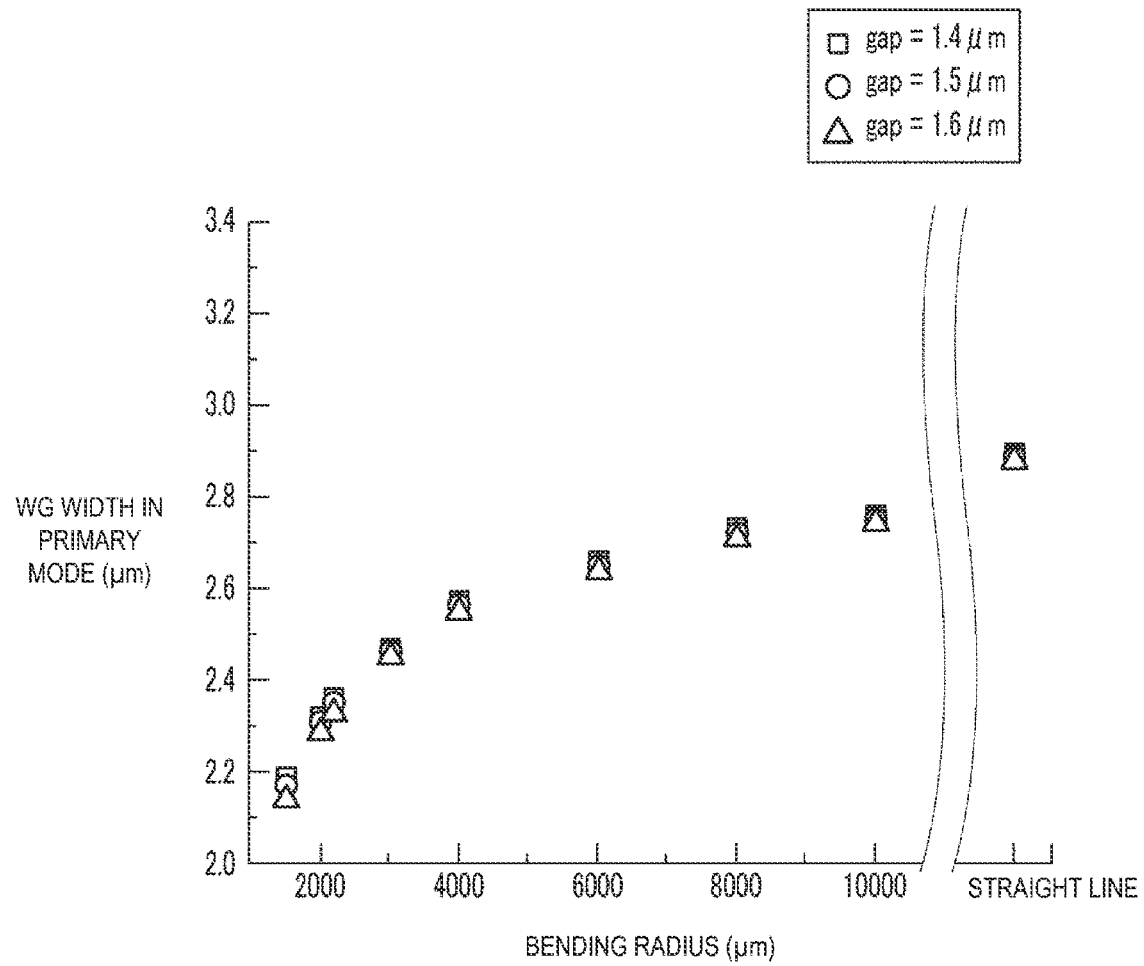
FIG. 10 is a diagram illustrating a relationship between a bending radius and W1 satisfying mode conversion conditions when W0 is fixed to 1 μm according to the first embodiment of the present disclosure.

FIG. 10 shows a relationship between a bending radius (horizontal axis) and a waveguide width $W_1$ (vertical axis) satisfying the mode conversion conditions when the waveguide width $W_0$ is fixed to 1 μm. The gaps between the waveguides are set to 1.4, 1.5, and 1.6 μm. An amount of change of the waveguide width $W_1$ can be controlled with a bending radius, and the waveguide width $W_1$ shifts to a narrow shape as the bending radius in which a difference in optical path length increases becomes smaller. $W_1$ satisfying the mode conversion conditions was numerically analyzed and determined using a beam propagation method (BPM). For example, in a case in which a wavelength of 520 nm calculated this time is mode-converted, the mode conversion conditions can be satisfied at a waveguide width in which the 1/e width is minimized by setting the bending radius to 2200 μm, and thus a mode coupler that reduces dependence on the waveguide width can be implemented.

Figure 11:
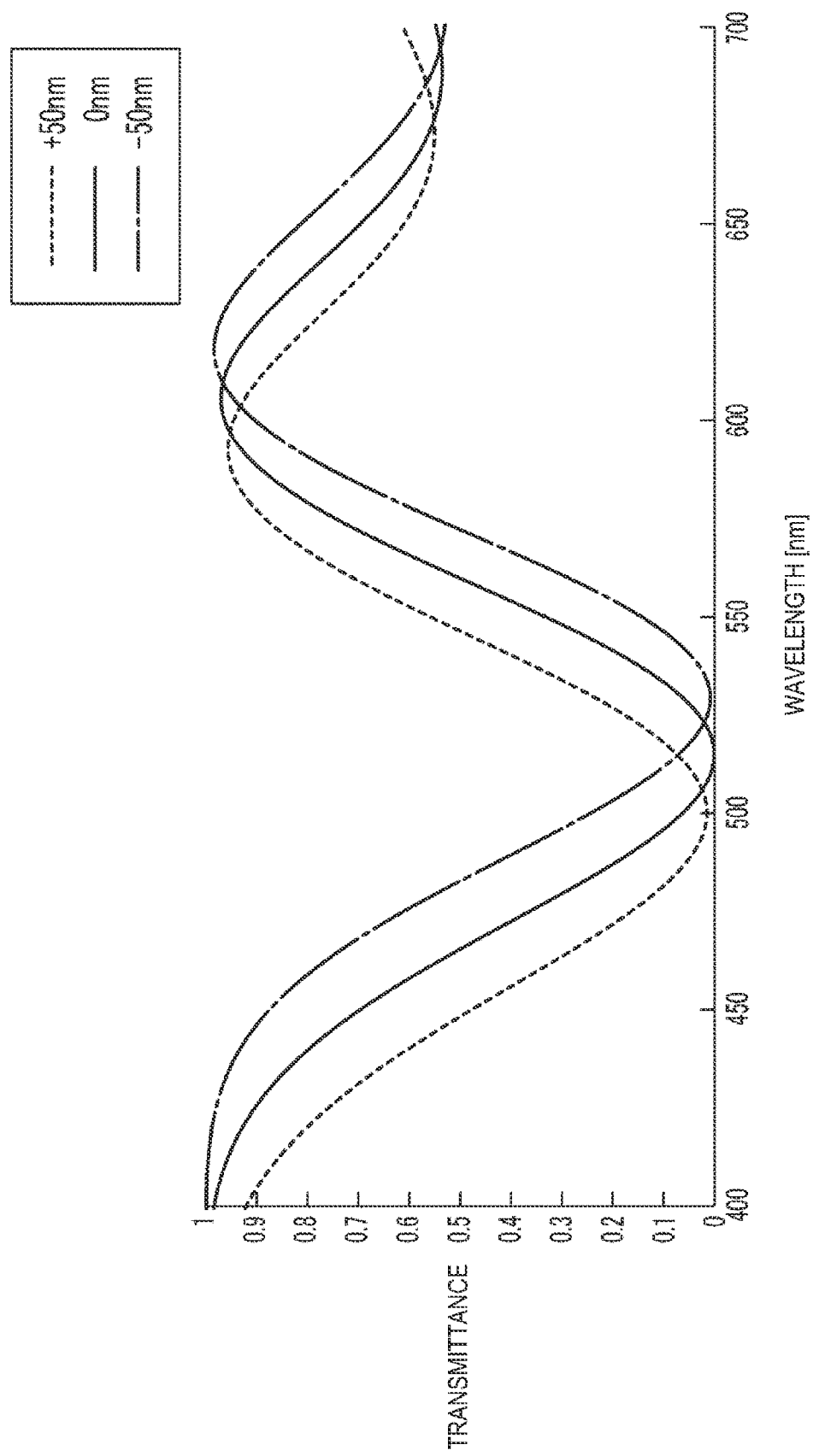
FIG. 11 is a diagram illustrating a calculation result according to the first embodiment of the present disclosure.

As an example, FIG. 11 shows calculation results when $W_0$ was equal to 1 μm, $W_1$ was equal to 2.9 μm (waveguide widths satisfying the mode conversion conditions in a linear waveguide with a wavelength of 520 nm, $W_0$ equal to 1.0 μm, and the primary mode), the gap between the waveguides was 1.5 μm, and ΔW was equal to ±50 nm. A spectrum indicates a transmittance of light that is input from the first waveguide (SM_WG) 703a and output to the first waveguide (SM_WG) 703a, meaning that a part with a low transmittance is mode-converted and transferred to the second waveguide (MM_WG) 703b.

Figure 12:
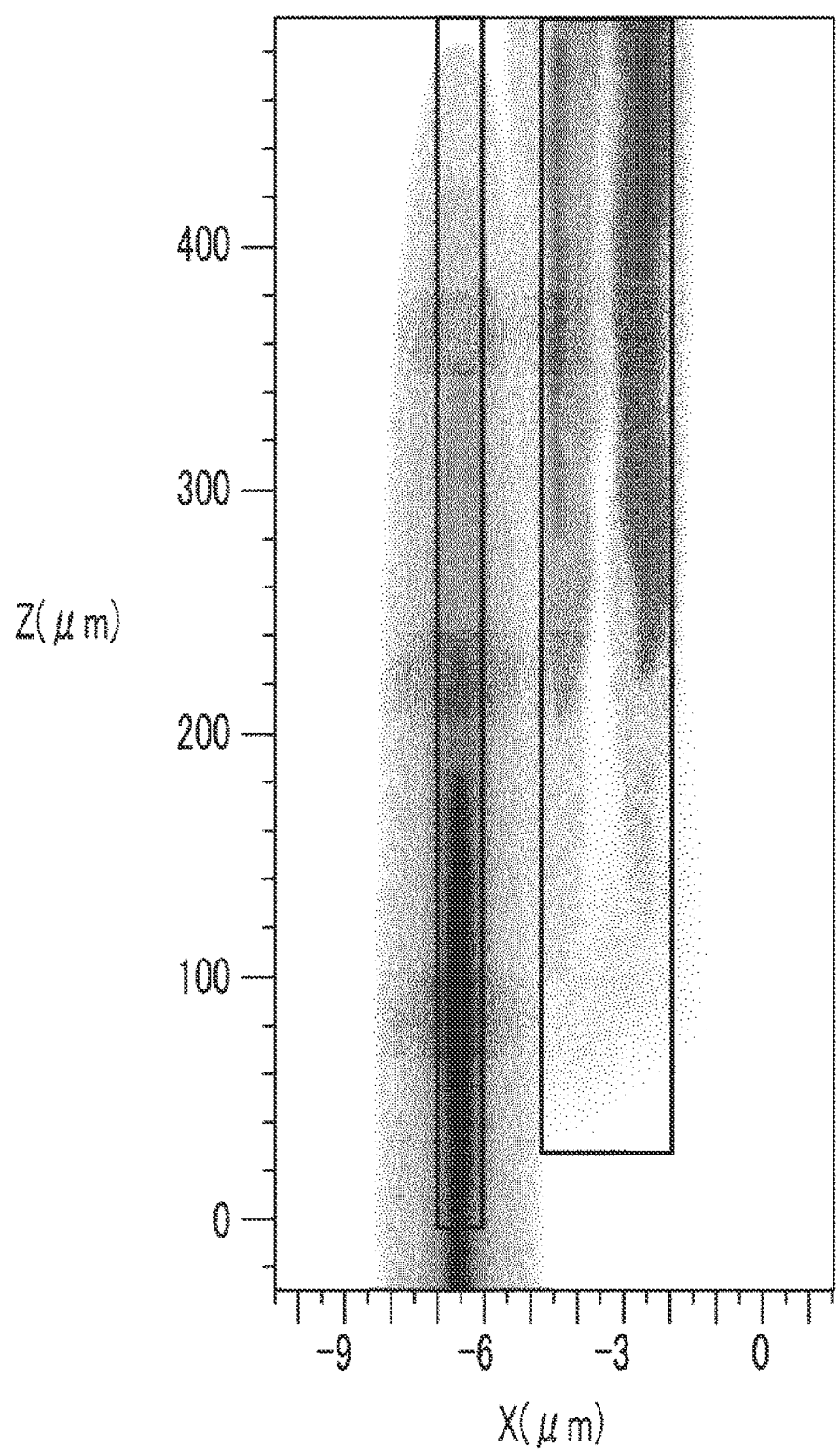
FIG. 12 is a diagram illustrating a state of light propagation according to the first embodiment of the present disclosure.
Figure 13:
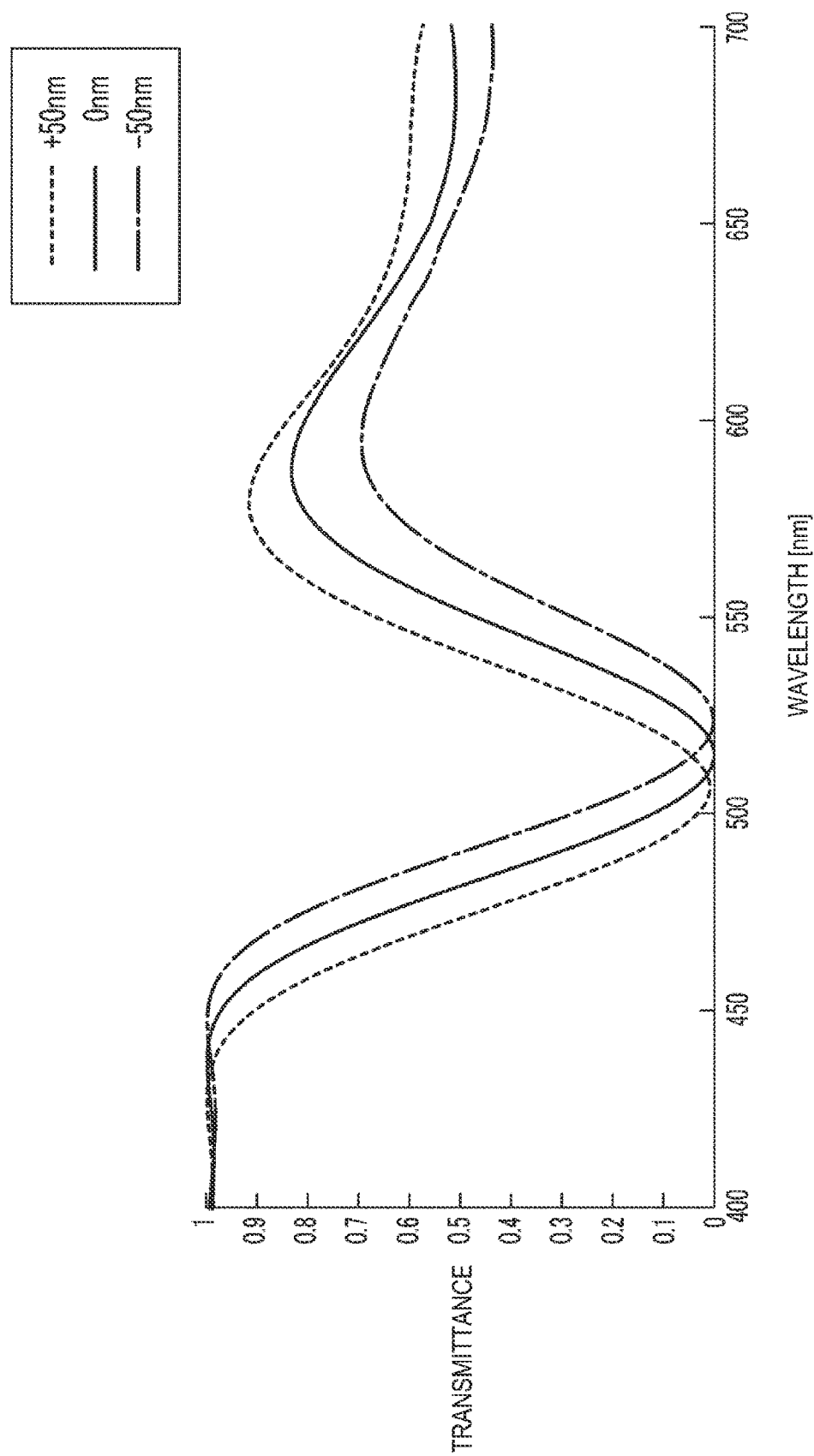
FIG. 13 is a diagram illustrating a calculation result according to the first embodiment of the present disclosure.

FIG. 12 illustrates a state of light propagating in the waveguides of FIG. 7. Next, FIG. 13 shows calculation results when $W_0$ was equal to 1 μm, $W_1$ was equal to 2.3 μm (waveguide widths satisfying the mode conversion conditions in a linear waveguide with a wavelength of 520 nm, $W_0$ equal to 1.0 μm, the primary mode, and a bending radius of 2200 μm), the gap between the waveguides was 1.5 μm, and ΔW was equal to ±50 nm. While the wavelength at which the transmittance is a minimum varies by approximately ±20 nm in the linear mode coupler, the variation is reduced to approximately ±10 nm in the bent mode coupler. Although a transmission band is wider in a linear mode coupler, it can be controlled by the gap between the waveguides, and if the gap between the waveguides of the bent mode coupler is slightly narrower, it can have a bandwidth similar to that of the linear mode coupler. Although the gaps between the waveguides of the linear mode coupler and the bent mode coupler are set to an identical value this time for the sake of comparison, it is a matter of course that the actual design is to be optimized. With the above configuration, it is possible to implement a mode coupler with reduced variation in optical characteristics according to variation in the waveguide width. Although the bending radius in which the 1/e width is minimized is exemplified in the present embodiment, it is a matter of course that, by bending the waveguide even a little, a waveguide width satisfying the mode conversion becomes narrower than in the linear mode coupler, and the effect of increasing tolerance is exhibited.

Second Embodiment

In a second embodiment, a wavelength multiplexing circuit that uses the bent mode coupler of the first embodiment will be described. When a wavelength multiplexing circuit is used, a converted mode needs to be converted again. With respect to bending, combinations of waveguide widths satisfying the mode conversion conditions for green light (G) when SM_WG is placed on the inner side and MM_WG is placed on the outer side will be denoted by $W_0$ and $W_1$ (it is assumed that the extreme value condition and the mode conversion conditions described in the first embodiment are matched).

FIG. 14(a) illustrates the optical circuit of FIG. 7 having the three following features described below. The first is that the optical circuit further includes a third waveguide in which light in an N-th order mode is guided. The second is that the first waveguide, the second waveguide, and the third waveguide are placed side by side in this order. The third is that the second waveguide and the third waveguide include, in the posterior stage of the first curved portion, a second curved portion in a curve shape curved toward the third waveguide while maintaining a combination of waveguide widths satisfying the mode conversion conditions. As indicated by the arrows in FIG. 14(a), the size of the gap between the first waveguide and the second waveguide is equal to the size of the gap between the second waveguide and third waveguide.

As illustrated in FIG. 14(a), in a case in which a width of two SM_WGs is set to $W_0$, green light (G) incident from Port 1 of a first waveguide (SM_WG 1) 1403a is mode-converted and transitions to a second waveguide (MM_WG) 1403b. Because the first half of a third waveguide (SM_WG 2) 1403c is placed on an outer side of the second waveguide (MM_WG) 1403b, the mode conversion conditions are not satisfied. Thus, the mode-converted light does not transition to the third waveguide (SM_WG 2) 1403c, but repeatedly transitions between the first waveguide (SM_WG 1) 1403a and the second waveguide (MM_WG) 1403b. In order to multiplex the light with blue light (B) incident from Port 2, the bending direction is converted and the bending radius of the first half of the first waveguide (SM_WG 1) 1403a is set to match the bending radius of the second half of the third waveguide (SM_WG 2) 1403c as illustrated in FIG. 14(a). Thus, green light (G) that has been mode-converted in the first waveguide (SM_WG 1) 1403a and transitioned to the second waveguide (MM_WG) 1403b can be mode-converted again and transition to the third waveguide (SM_WG 2) 1403c. On the other hand, the blue light (B) is transmitted as it is because the light does not satisfy the mode conversion conditions in any waveguide. Thus, a wavelength multiplexer that reduces dependence on a waveguide width can be achieved. Light to be transferred is the light having a long wavelength and is multiplexed in a waveguide in which light having a short wavelength propagates, and the reason for this is that light having a long wavelength with large light exudation partially transfers even if the mode conversion conditions are not satisfied as shown in FIG. 13. In other words, in a case in which it is designed to satisfy the mode conversion conditions with blue light (B) in an attempt to transfer the blue light (B) in a waveguide in which green light (G) is propagating, part of the green light (G) is coupled to the waveguide in which the blue light (B) is propagating and lost. Here, although the second half of the first waveguide (SM_WG 1) 1403a is aligned with the second waveguide (MM_WG) 1403b, light has transferred in the first half thereof, and thus the second half may be eliminated or may be separated from the second waveguide (MM_WG) 1403b by a bent waveguide. In addition, although the wavelengths are multiplexed by inverting the curvature here, but it is possible to couple G to SM_WG 2 without inverting the curvature by setting the third waveguide (SM_WG 2) 1403c to be narrower than $W_0$ and setting a width thereof to a waveguide with taking the difference in curvature into consideration as is understood from equation (1).

The optical circuit of FIG. 14(a) may be configured such that, in a second curved portion in the second half, the gap between the first waveguide 1403a and the second waveguide 1403b is greater than the gap in the first curved portion or the first waveguide is not placed.

The embodiment is not limited to the configuration illustrated in FIG. 14(a), and a wavelength multiplexing circuit that uses a mode coupler that is bent in the same direction by appropriately designing a waveguide of a third waveguide (SM_WG 2) 2403c and includes a first waveguide (SM_WG 1) 2403a, a second waveguide (MM_WG) 2403b, and the third waveguide (SM_WG 2) 2403c as illustrated in FIG. 14(b) can also be used. The optical circuit of FIG. 14(b) may be configured such that, in a second curved portion in the second half, the gap between the first waveguide and the second waveguide is greater than the gap in the first curved portion or the first waveguide is not placed.

Third Embodiment

Figure 15:
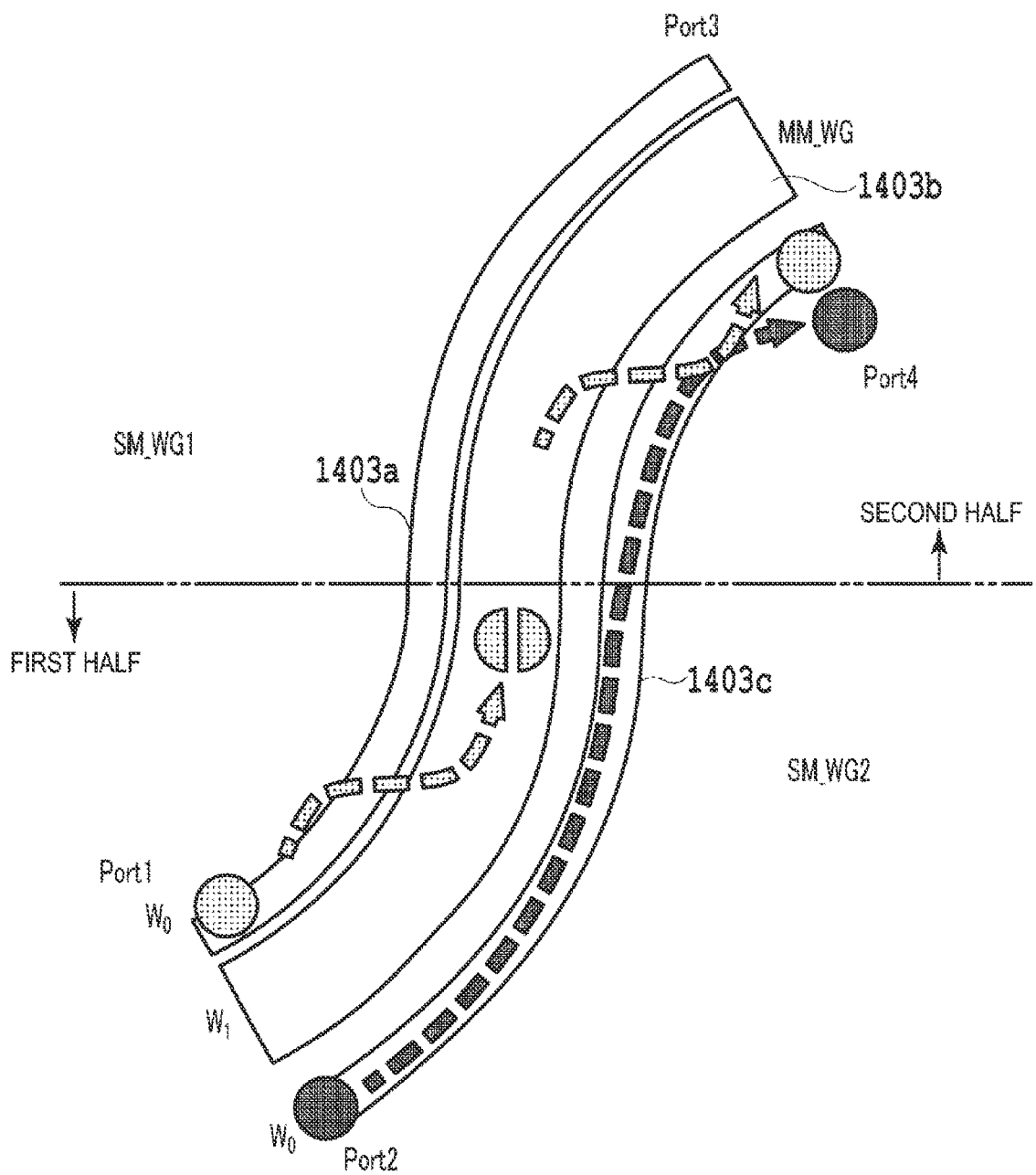
FIG. 15 is a diagram illustrating an optical circuit according to a third embodiment of the present disclosure.

In a third embodiment, a method for further reducing a characteristic variation with respect to a change in waveguide width by narrowing the gap between the first waveguide (SM_WG$_1$) 1403a and the second waveguide (MM_WG) 1403b of the wavelength multiplexer that uses the mode coupler described in the second embodiment as illustrated in FIG. 15 will be described.

Figure 14:
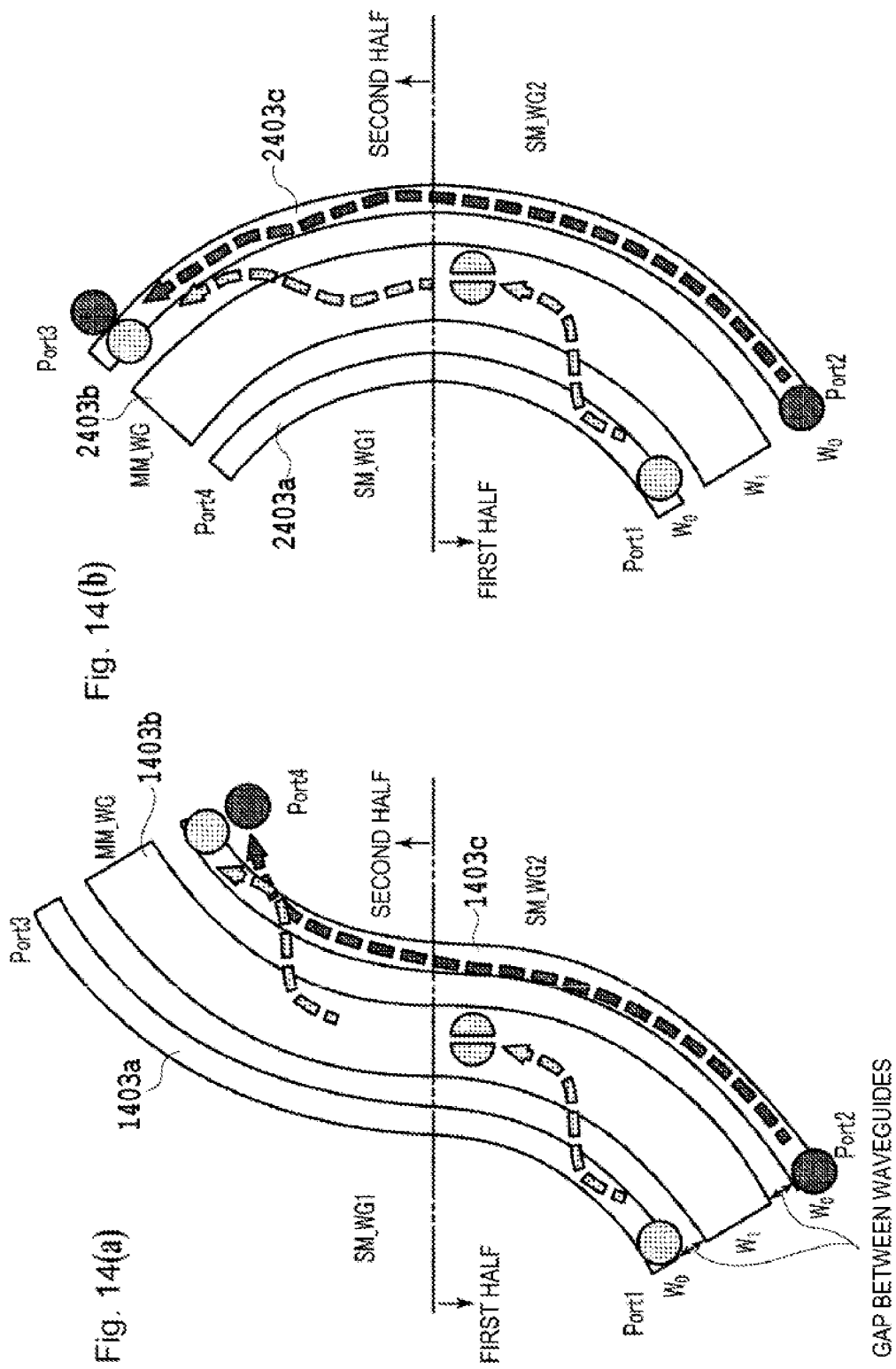
FIG. 14(a) is a diagram illustrating an optical circuit according to a second embodiment of the present disclosure.
FIG. 14(b) is a diagram illustrating an optical circuit according to the second embodiment of the present disclosure.

The optical circuit of FIG. 15 has a gap between the first waveguide 1403a and the second waveguide 1403b in the first curved portion that is smaller than a gap between the second waveguide 1403b and the third waveguide 1403c in the second curved portion in FIG. 14 (a). Note that a gap between the first waveguide 1403a and the second waveguide 1403b in the first curved portion may be likewise smaller than a gap between the second waveguide and the third waveguide in the second curved portion in FIG. 14(b).

The optical circuit of FIG. 15 may be configured such that, in a second curved portion in the second half, the gap between the first waveguide 1403a and the second waveguide 1403b is greater than the gap in the first curved portion or the first waveguide is not placed.

In the mode coupler, if the gap between the waveguides becomes narrower, the spectrum of the port for conversion becomes broader and the coupler length required for light transition becomes shorter. On the other hand, if the gap is large, the spectrum becomes sharp, and the coupler length becomes longer. The reason for this is that the gap becomes narrower and light transitions between the waveguides while overlapping in a large portion of the light, and similar characteristics are obtained also with a typical directional coupler. When blue light (B) and green light (G) are multiplexed, a gap needs to be set so that the blue light (B) does not go out. In a case of a bent mode coupler, because light does not go out to the third waveguide (SM_WG 2) 1403c in the first half, and thus by closing the gap between the first waveguide (SM_WG 1) 1403a and the second waveguide (MM_WG) 1403b, transmission characteristics of Port 1 to Port 4 can be widened without affecting characteristics of Port 2 to Port 4. Therefore, fluctuation in optical characteristics can be further reduced even when the waveguide width changes.

Figure 16:
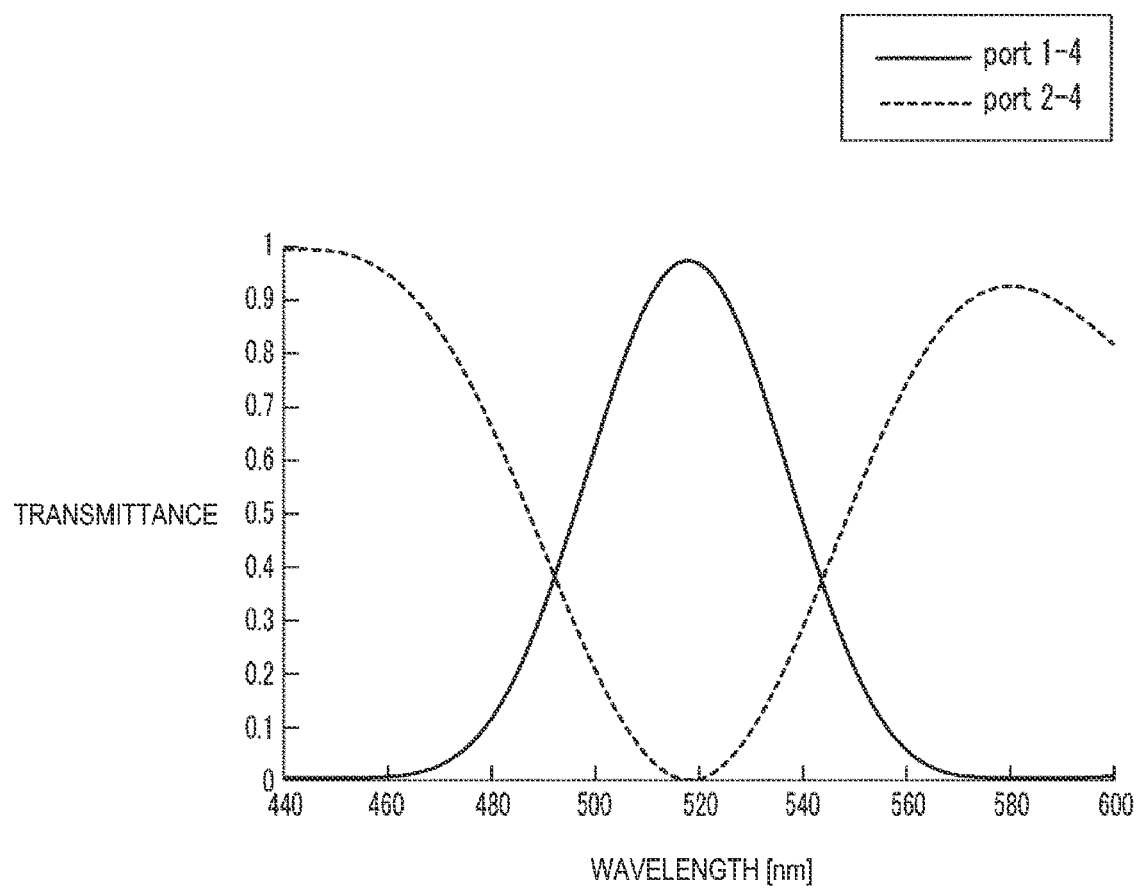
FIG. 16 is a diagram illustrating a spectrum according to the second embodiment of the present disclosure.
Figure 17:
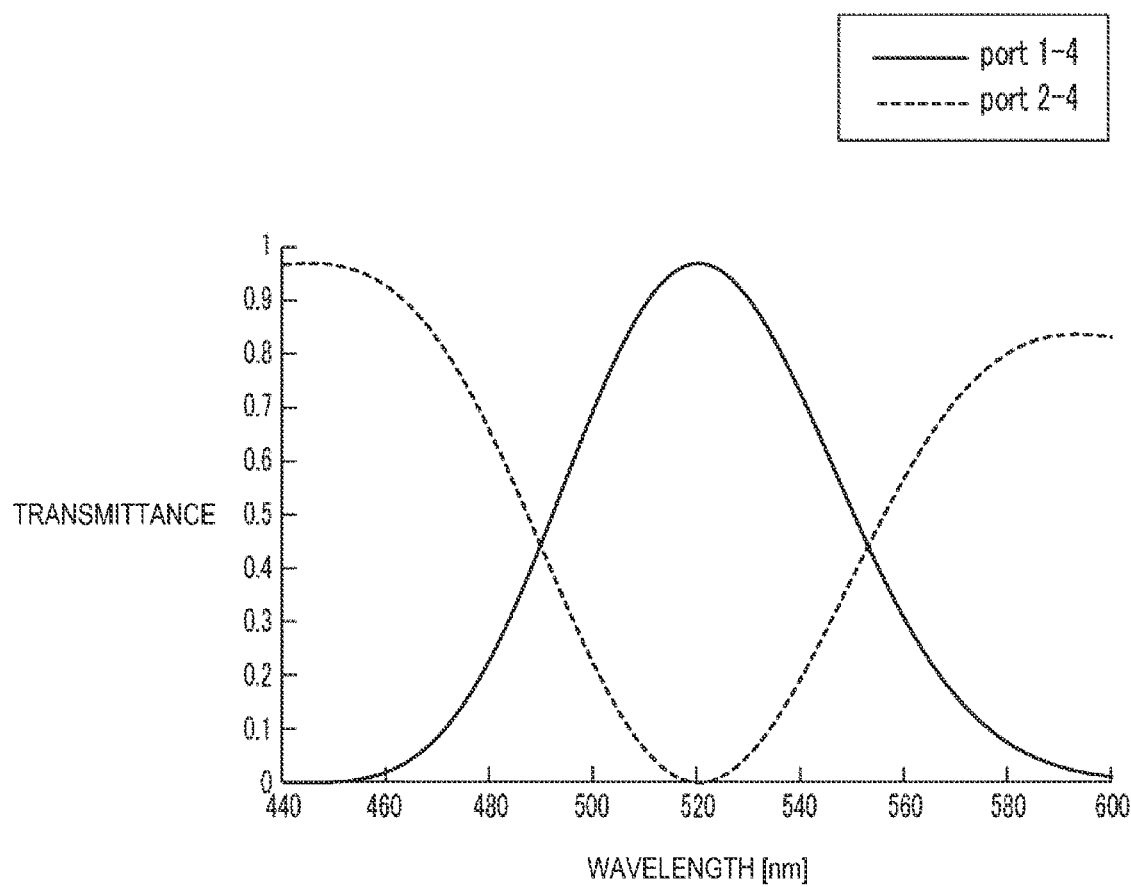
FIG. 17 is a diagram illustrating a spectrum according to the third embodiment of the present disclosure.

For example, in FIG. 14(a), the spectrum of a case in which $W_0=1$ µm, $W_1=2.3$ µm, a bending radius is 2200 µm, and the gap between the waveguides is 1.5 µm is illustrated in FIG. 16, and, in FIG. 15, the spectrum of a case in which a gap on SM_WG 1 side is 1.1 µm, and a gap on SM_WG 2 side is 1.5 µm is illustrated in FIG. 17.

It can be seen that even when the gap on the first waveguide (SM_WG 1) 1403a side is narrowed, the transmission band of Port 1 to Port 4 is widened without affecting the characteristics of Port 2 to Port 4.

Fourth Embodiment

Figure 18:
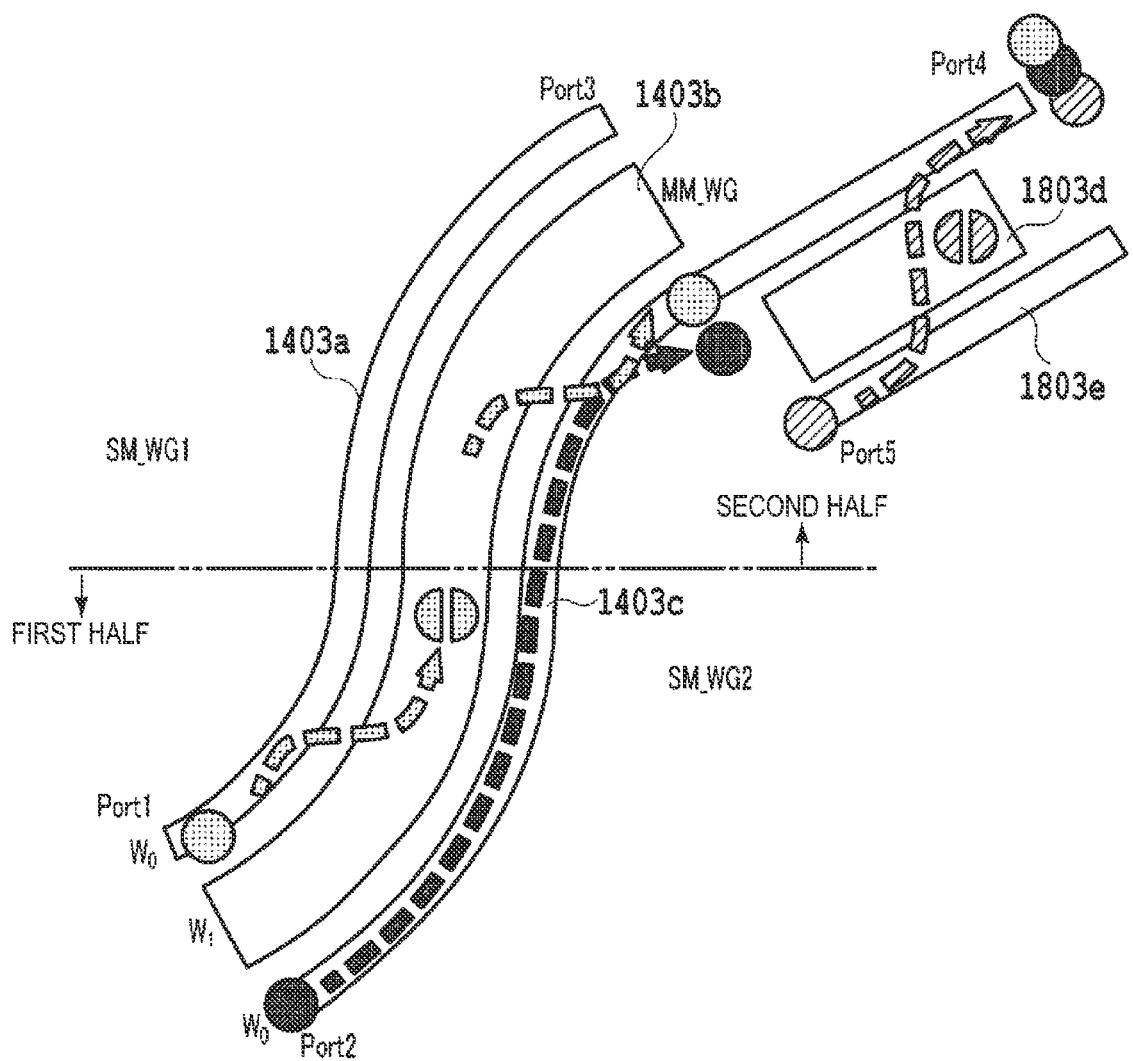
FIG. 18 is a diagram illustrating an optical circuit according to a fourth embodiment of the present disclosure.

An RGB coupler having a circuit that multiplexes red light (R) in the posterior stage of the optical circuit of FIGS. 14(a) and 15 as illustrated in FIG. 18 will be described.

The optical circuit of FIG. 18 has a configuration in which a fourth waveguide 1803*d* in which light in a M-th order mode is guided and a fifth waveguide 1803*e* in which light in an N-th order mode is guided are provided in the posterior stage of the optical circuit of FIGS. 14(*a*) and 15 and the third waveguide 1403*c*, the fourth waveguide 1803*d*, and the fifth waveguide 1803*e* are placed side by side in this order.

The optical circuit of FIG. 18 may be configured such that, in a second curved portion in the second half, the gap between the first waveguide 1403*a* and the second waveguide 1403*b* is greater than the gap in the first curved portion or the first waveguide is not placed.

Figure 19A:
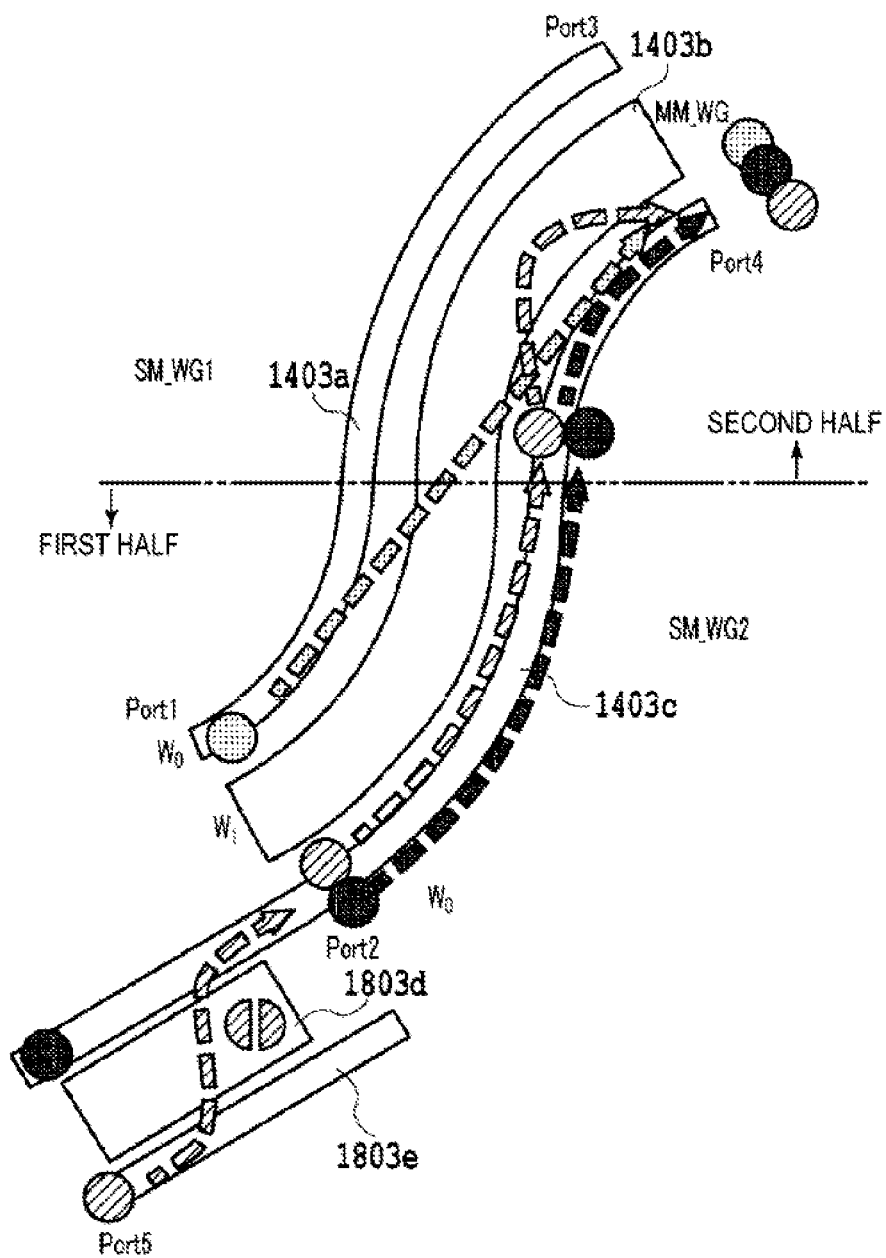
FIG. 19(a) is a diagram illustrating an optical circuit according to a fifth embodiment of the present disclosure.
Figure 19B:
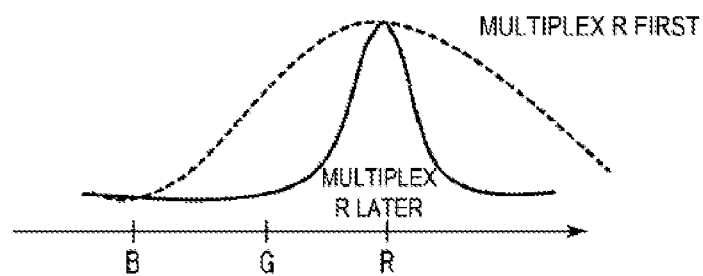
FIG. 19(b) is a diagram illustrating multiplexed bands according to the fourth and fifth embodiments of the present disclosure.

In the present embodiment, first, blue light (B) and green light (G) are multiplexed, and then red light (R) is multiplexed, so a mode coupler needs to be designed not to allow the green light (G) to escape. As a result, a narrow band is formed as illustrated in FIG. 19(*b*).

Although the circuit that multiplexes red light (R) is installed in the posterior stage of the optical circuit of FIGS. 14(*a*) and 15 in the present embodiment, a circuit that multiplexes red light (R) may be installed in the posterior stage of the optical circuit of FIG. 14(*b*).

Although the circuit that multiplexes R is installed in the posterior stage in FIGS. 14(*a*) and 15 in the present embodiment, a bent mode coupler may be installed in the posterior stage.

Fifth Embodiment

A case in which blue light (B) and red light (R) are multiplexed in an anterior stage of a circuit in FIGS. 14(*a*) and 15 as illustrated in FIG. 19(*a*) will be described.

The optical circuit of FIG. 19(*a*) has a configuration in which a fourth waveguide 1803*d* in which light in a M-th order mode is guided and a fifth waveguide 1803*e* in which light in an N-th order mode is guided are provided in the anterior stage of the optical circuit of FIG. 14(*a*) and the third waveguide 1403*c*, the fourth waveguide 1803*d*, and the fifth waveguide 1803*e* are placed side by side in this order.

The optical circuit of FIG. 19 may be configured such that, in a second curved portion in the second half, the gap between the first waveguide 1403*a* and the second waveguide 1403*b* is greater than the gap in the first curved portion or the first waveguide is not placed.

Red light (R) and blue light (B) do not transition in the first half of the bent mode coupler at all because the third waveguide (SM_WG 2) 1403*c* is located outside. Meanwhile, a part of light transitions in the second half because the third waveguide (SM_WG 2) 1403*c* is located inside. Red light (R) having a particularly long wavelength transitions slightly even if a transition condition is not satisfied. In the bent mode coupler, light does not transfer to the outer first waveguide (SM_WG 1) 1403*a* and returns to the third waveguide (SM_WG 2) 1403*c* via the second waveguide (MM_WG) 1403*b*, and thus multiplexing is possible by properly adjusting a coupling cycle of the green light (G) to a recoupling cycle of the red light (R). Note that, blue light (B) little transitions because of its short wavelength.

In the present embodiment, because blue light (B) is multiplexed with red light (R) when waves are multiplexed first, the band can be widened as illustrated in FIG. 19(*b*), and thus a mode coupler that multiplexes red light (R) can also increase tolerance.

Although an example in which blue light (B) and red light (R) are multiplexed in the anterior stage of the circuit in FIGS. 14(*a*) and 15 has been introduced in the present embodiment, a circuit that multiplexes blue light (B) and red light (R) in the posterior stage of the optical circuit of FIG. 14(*b*) may be installed.

INDUSTRIAL APPLICABILITY

The present disclosure can be applied to an optical device, and more particularly to a wavelength multiplexing/demultiplexing optical circuit using a mode.

The invention claimed is:

1. An optical circuit comprising:
a first waveguide configured to guide light in an N-th order mode (N is an integer satisfying N≥0);
a second waveguide, having a larger width than the first waveguide, configured to guide light in an M-th order mode (M is an integer satisfying M>N); and
a third waveguide configured to guide light in the N-th order mode, the third waveguide having a width that is the same as the width of the first waveguide,
wherein the first waveguide, the second waveguide, and the third waveguide are placed side by side in this order in a manner that the first waveguide, the second waveguide, and the third waveguide do not contact each other,
wherein the second waveguide includes at least a first curved portion in a curve shape curved toward the first waveguide while maintaining a combination of waveguide widths satisfying a mode conversion condition,
wherein the second waveguide and the third waveguide include, in a posterior stage of the first curved portion, a second curved portion in a curved shape curved toward the third waveguide while maintaining a combination of waveguide widths satisfying the mode conversion condition, and
wherein the first and third waveguides curve with the second waveguide.

2. The optical circuit according to claim 1,
wherein, in the second curved portion, a gap between the first waveguide and the second waveguide is larger than a gap in the first curved portion.

3. The optical circuit according to claim 1, wherein a gap between the first waveguide and the second waveguide in the first curved portion is smaller than a gap between the second waveguide and the third waveguide in the second curved portion.

4. The optical circuit according to claim 1,
wherein, in a posterior stage of the second curved portion, a fourth waveguide configured to guide light in the M-th order mode and a fifth waveguide configured to guide light in the N-th order mode are provided, and
the first waveguide, the fourth waveguide, and the fifth waveguide are placed side by side in this order.

5. The optical circuit according to claim 1,
wherein, in an anterior stage of the third waveguide, a fourth waveguide configured to guide light in the M-th order mode and a fifth waveguide configured to guide light in the N-th order mode are provided, and
the first waveguide, the fourth waveguide, and the fifth waveguide are placed side by side in this order.

6. The optical circuit according to claim 2,
wherein a gap between the first waveguide and the second waveguide in the first curved portion is smaller than a gap between the second waveguide and the third waveguide in the second curved portion.

7. The optical circuit according to claim 2,
wherein, in a posterior stage of the second curved portion, a fourth waveguide configured to guide light in the M-th order mode and a fifth waveguide configured to guide light in the N-th order mode are provided, and the first waveguide, the fourth waveguide, and the fifth waveguide are placed side by side in this order.

8. The optical circuit according to claim 3, wherein, in a posterior stage of the second curved portion, a fourth waveguide configured to guide light in the M-th order mode and a fifth waveguide configured to guide light in the N-th order mode are provided, and the first waveguide, the fourth waveguide, and the fifth waveguide are placed side by side in this order.

9. The optical circuit according to claim 2, wherein, in an anterior stage of the third waveguide, a fourth waveguide configured to guide light in the M-th order mode and a fifth waveguide configured to guide light in the N-th order mode are provided, and the first waveguide, the fourth waveguide, and the fifth waveguide are placed side by side in this order.

10. The optical circuit according to claim 3, wherein, in an anterior stage of the third waveguide, a fourth waveguide configured to guide light in the M-th order mode and a fifth waveguide configured to guide light in the N-th order mode are provided, and the first waveguide, the fourth waveguide, and the fifth waveguide are placed side by side in this order.

* * * * *